United States Patent
Yuan et al.

(10) Patent No.: US 9,553,505 B1
(45) Date of Patent: Jan. 24, 2017

(54) CIRCUIT FOR ELECTROMAGNETIC INTERFERENCE (EMI) REDUCTION AND PEAK POWER LEVEL INCREASE THROUGH PULSE MODIFICATION

(71) Applicants: Harrison Yuan, Riverwoods, IL (US); Hailong Tang, Jiangning (CN); Charles Liang, Riverwoods, IL (US)

(72) Inventors: Harrison Yuan, Riverwoods, IL (US); Hailong Tang, Jiangning (CN); Charles Liang, Riverwoods, IL (US)

(73) Assignee: CITA TECHNOLOGIES, LLC, Buffalo Grove, IL (US)

( * ) Notice: Subject to any disclaimer, the term of this patent is extended or adjusted under 35 U.S.C. 154(b) by 0 days.

(21) Appl. No.: 14/829,925

(22) Filed: Aug. 19, 2015

(51) Int. Cl.
*H02M 1/14* (2006.01)
*H02M 1/44* (2007.01)
*H02M 3/335* (2006.01)

(52) U.S. Cl.
CPC ........... *H02M 1/44* (2013.01); *H02M 3/33515* (2013.01); *H02M 3/33523* (2013.01); *H02M 1/14* (2013.01)

(58) Field of Classification Search
CPC .......... H02M 1/12; H02M 1/14; H02M 1/143; H02M 1/15; H02M 1/44; H02M 2001/12; H02M 2001/327
See application file for complete search history.

(56) References Cited

U.S. PATENT DOCUMENTS

| | | | | |
|---|---|---|---|---|
| 7,061,780 B2* | 6/2006 | Yang | ................ | H02M 3/33523 363/21.13 |
| 7,203,079 B2* | 4/2007 | Yang | ................ | H02M 3/33523 323/283 |
| 8,194,425 B2* | 6/2012 | Park | ........................ | H03K 7/06 323/288 |
| 2012/0163042 A1* | 6/2012 | Zhou | ...................... | H02M 1/44 363/21.17 |
| 2013/0182469 A1* | 7/2013 | Chiang | .................. | H02M 1/12 363/44 |

* cited by examiner

Primary Examiner — Matthew Nguyen (57) ABSTRACT

A circuit for electromagnetic interference (EMI) reduction contains a signal input, a signal output, a pulse count controlling unit, a stand-by power reduction unit, a pulse series delay unit, and a temperature sensing unit. An alternating current (AC) input is provided to the signal input and the modified signal is drawn out from the signal output. The pulse count controlling unit and the pulse series delay unit modify the pulses of the pulse-width modulation process such that the overall efficiency of the circuit is increased. In particular, the pulse count controlling unit increases the number of pulses per cycle such that additional power is transferred onto the output load. On the other hand, the pulse series delay unit shifts the start time of a series of pulses such that the overall emission is reduced. The stand-by power reduction unit disconnects power when a circuit overload occurs.

19 Claims, 8 Drawing Sheets

CIRCUIT FOR ELECTROMAGNETIC INTERFERENCE (EMI) REDUCTION AND PEAK POWER LEVEL INCREASE THROUGH PULSE MODIFICATION

FIELD OF THE INVENTION

The present invention relates generally to an electronic circuit designed for electromagnetic interference (EMI) reduction. More specifically, the electronic circuit of the present invention modifies the pulses of a pulse-width modification process in order to reduce electromagnetic interference and increase peak power level in an alternating current (AC) to direct current (DC) switching power supply.

BACKGROUND OF THE INVENTION

The main intention of the present is to reduce electromagnetic interference (EMI) caused by conducted and radiated emission through a process of modifying the pulses from a pulse width modulation process. The present invention also increases the peak power levels which leads to increased efficiency. Conventional switching power supplies utilize continuous pulse width modulation (PWM) process. In contrast, the present invention modifies the pulses of the PWM process by separating the pulses of the PWM process into different groups. Moreover, the present invention modifies the pulses of the PWM process during a second half of the rectified waveform by shifting the start time of the pulses in a time domain. Resultantly, the spike energy of the waveform is distributed along the time domain. Additionally, the present invention increases the number of pulses of a waveform such that more power can be delivered to the output load as necessary.

By modifying the pulses of the PWM process, the present invention addresses a number of issues prevalent with the existing switching power supply circuits. As mentioned earlier, when large spikes occur as noise during switching, the noise gets conducted back to the AC input lines and also gets radiated into the air causing EMI. Therefore, an external filtering circuit is required to meet the electromagnetic compatibility (EMC) standards. More specifically, the present invention stops switching action during the charging phase of a capacitor and allows switching to occur only during the discharging phase of the capacitor. In doing so, the present invention blocks noise through a diode which also eliminates the need for a large and costly external filtering circuit.

Almost all switching power supplies use electrolytic capacitors which lose some of its capacitance with low temperatures. In particular, if the temperature drops below a certain value, the device the capacitor is being used on may not function to its fullest capabilities. Therefore, the need for a method which helps the device to function at its fullest capabilities at very low temperatures is clearly evident.

The objective of the present invention is to address the aforementioned issues. More specifically, the present invention introduces an application specific integrated circuit which reduces EMI and increases peak power level through pulse modification. In particular, the present invention has the ability to receive a discontinuous set of pulses and shift the start time of a series of pulses per cycle. Furthermore, the present invention has the ability to increase the number of pulses according to the load requirements. In a broader perspective, the present invention is small in size, which is beneficial when utilizing the present invention within a device. In contrast to traditional switching power supplies, the present invention provides minimum interference and higher peak power when used in a wireless circuit. Additionally, the present invention adjusts the working mode according to the temperature such that low temperatures have no effect on the overall functionality of the device the present invention is being used on.

DETAIL DESCRIPTIONS OF THE INVENTION

All illustrations of the drawings are for the purpose of describing selected versions of the present invention and are not intended to limit the scope of the present invention.

The present invention introduces a circuit for electromagnetic interference (EMI) reduction and peak power level increase. In contrast to other EMI reduction circuits, the present invention focuses on pulse modification in order to reduce EMI. In the preferred embodiment of the present invention, the present invention has a small switching power supply with an alternating current (AC) input ranging from 90V to 475V. Moreover, the present invention is small in size, allowing the present invention to be used in a wide array of circuits where size, efficiency, and reliability are critical.

Figure 1A:
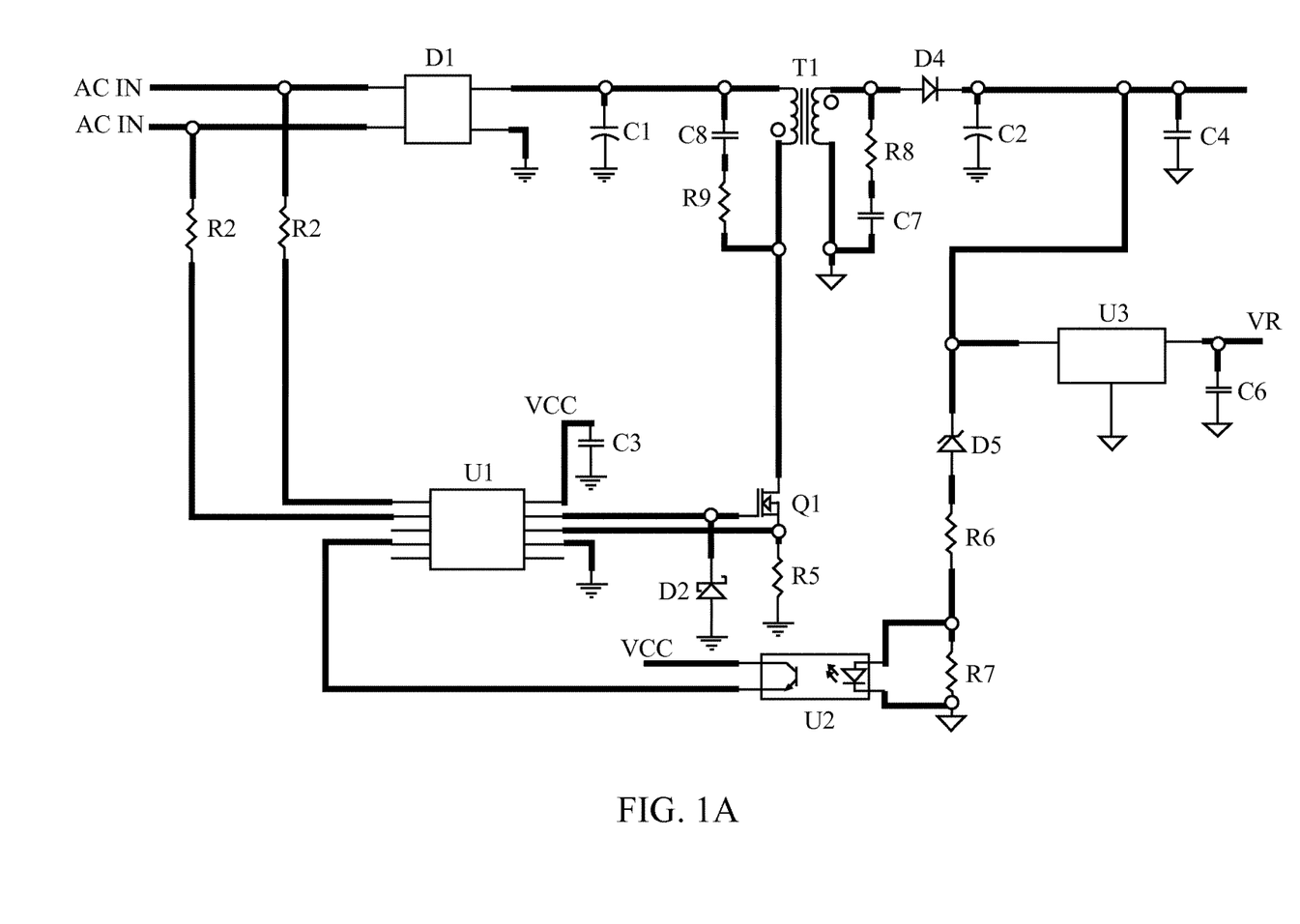
FIG. 1A is a circuit diagram of the present invention and the EMI reduction circuit.
Figure 1B:
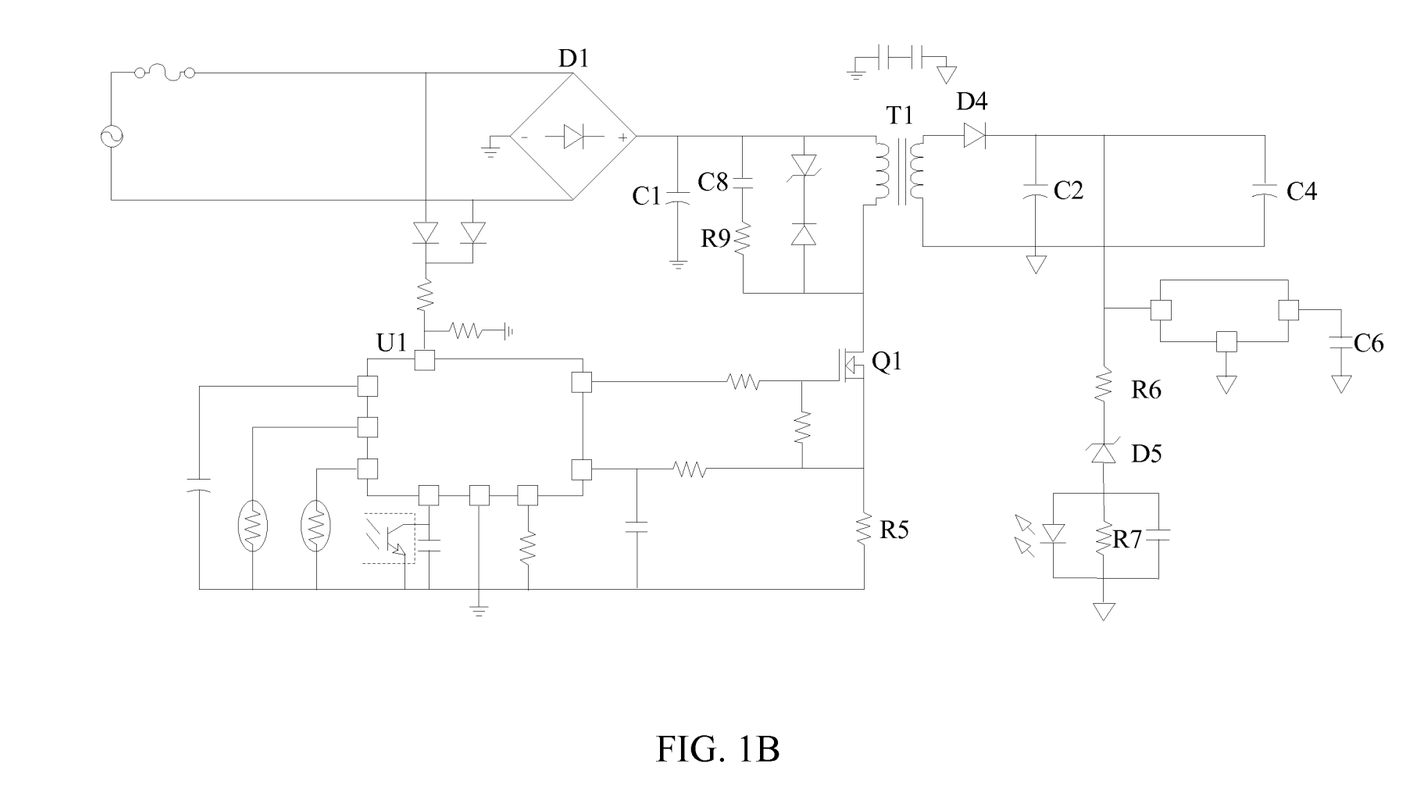
FIG. 1B is a circuit diagram illustrating the pin configurations of the present invention and the EMI reduction circuit.
Figure 2:
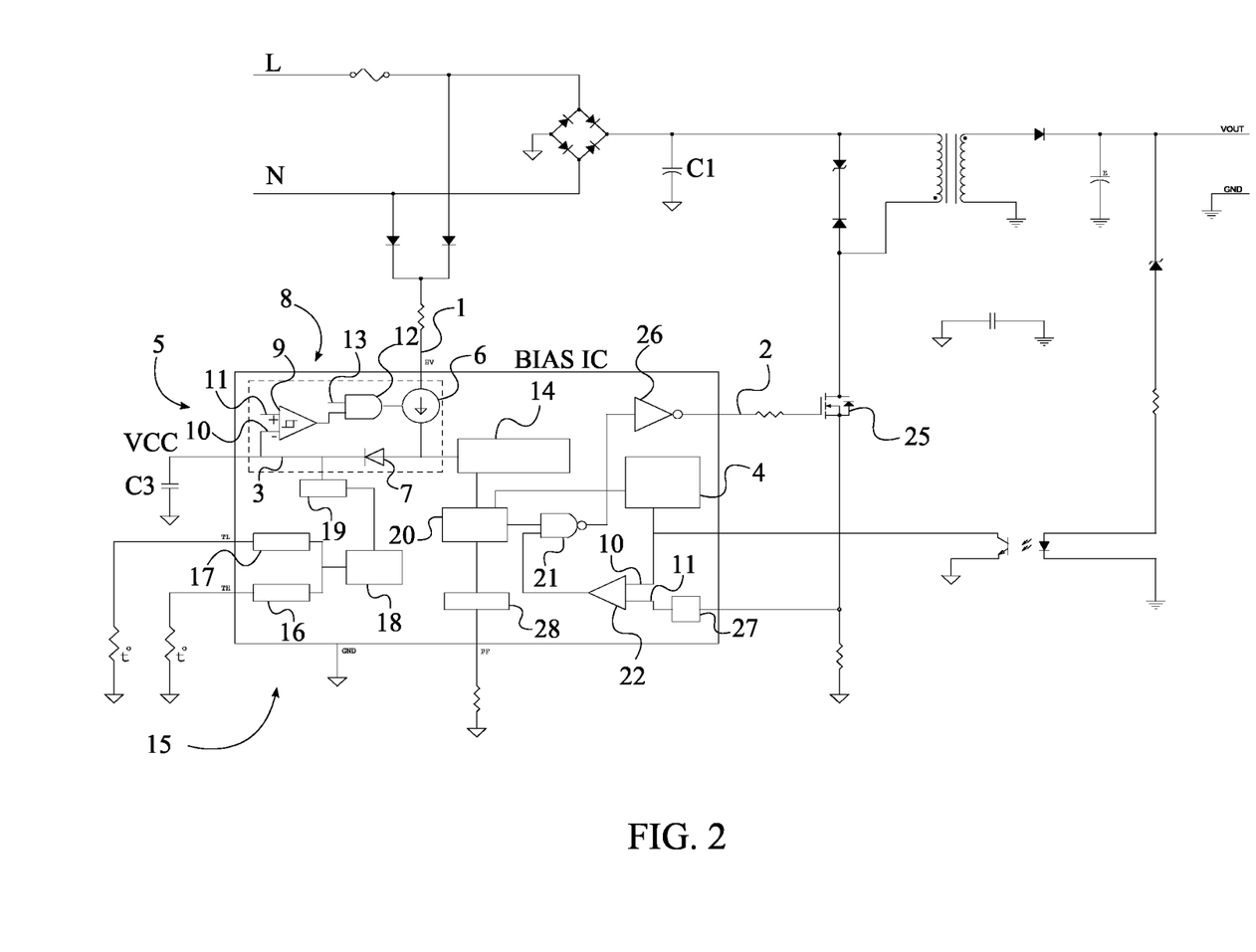
FIG. 2 is another circuit diagram of the present invention and the EMI reduction circuit.

As illustrated in FIG. 1A, FIG. 1B, and FIG. 2, the present invention comprises a signal input 1, a signal output 2, a load line 3, a pulse count controlling unit 4, a stand-by power reduction unit 5, and a pulse series delay unit 14. The signal input 1 draws current into the present invention from the AC input of the EMI reduction circuit. Therefore, the signal input 1 is utilized as an entry point for the signal. The signal input 1 divides into two paths of which one path is the load line 3. Moreover, the signal input 1 is electronically connected to the load line 3. The load line 3 is electronically integrated through the stand-by power reduction unit 5 such that the stand-by power reduction unit 5 can directly impact the current flow through the load line 3. The stand-by power reduction unit 5 disconnects the power supply to the present invention when the voltage is above a predefined value. More specifically, the power supply of the present invention is controlled such that the power supply is more than the maximum possible load. In the preferred embodiment of the present invention, the maximum possible load is approximately one third of the peak load. Resultantly, the stand-by power reduction unit 5 improves efficiency and reliability of the present invention. The other line of the signal input 1 is connected to the pulse series delay unit 14. The pulse series delay unit 14, which is electronically connected to the load line 3, shifts the starting point of the pulse width modulation (PWM) intervals such that the conducted emission is reduced. Moreover, the radiated emission is also lowered since the switching energy is spread in the time domain. As a result, the overall emission levels of the present invention are kept low. The pulse series delay unit 14 is also electronically connected to an oscillator 20 which is used to generate a triangle wave. The oscillator 20 is electronically connected to the pulse count controlling unit 4. The present invention also utilizes a frequency setting unit 28 which is electronically connected to the oscillator 20. The pulse count controlling unit 4 increases the number of pulses for each cycle. As a result, the overall power supplied to the system can be boosted as required. Moreover, the pulse count controlling unit 4 is electronically connected to the signal output 2 which is used to draw out the adjusted signal from the present invention. The present invention further comprises a temperature sensing unit 15 which is electronically connected to the load line 3. The temperature sensing unit 15 is utilized to maintain the functionality of the present invention at low temperatures.

Figure 3:
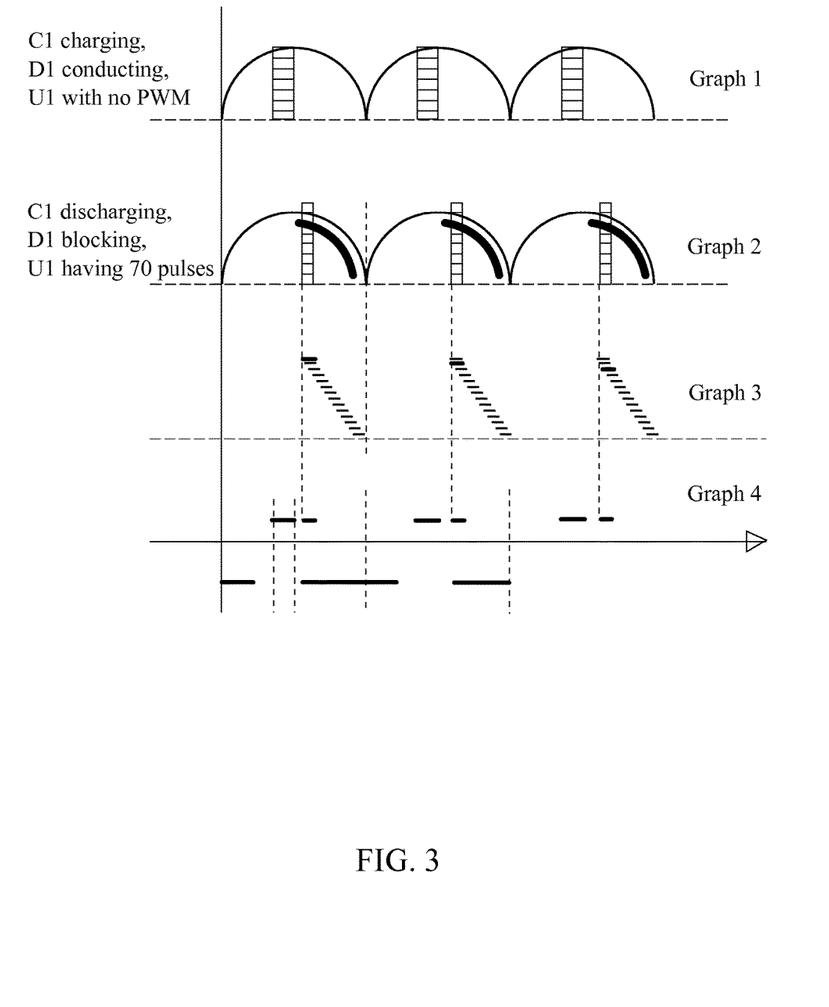
FIG. 3 illustrates the resulting shift from the pulse series delay unit.
Figure 7:
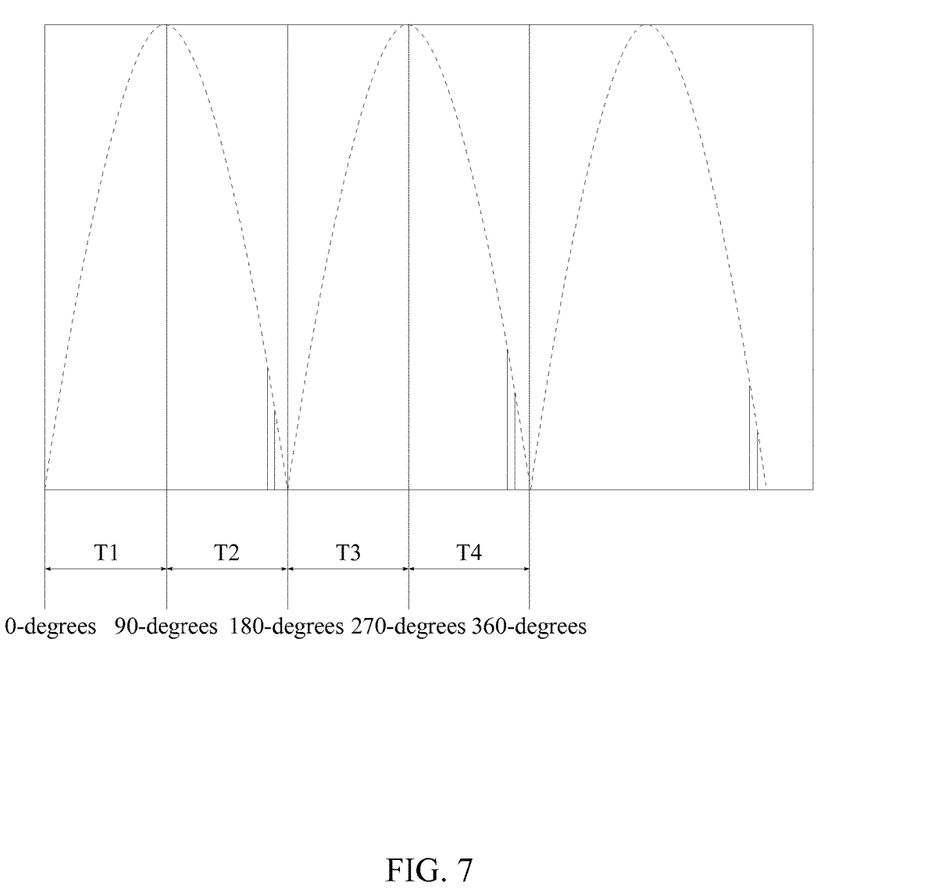
FIG. 7 illustrates the switching time periods of the capacitor.

Conventional switching power supply systems experience emission caused through spikes that occur during switching. As previously discussed and illustrated in FIG. 3, the pulse series delay unit 14 reduces emission by shifting the start time of a series of pulses during the PWM process. In particular, the starting point of series of pulses is shifted in time compared to the starting point of the previous cycle. As a result, the spiking locations are different from one location to the other such that the spiking energy is spread along the time domain such that the radiated emission is reduced. Even though the start time is shifted, the number of the pulses per cycle remains the same throughout the process. During the first half of a cycle, the output is lower than the input voltage and the present invention does not start switching during this time period. However, when the charge reaches the peak value and the capacitor starts discharging, the output voltage is larger than the input voltage. As shown in Graph 3 and Graph 4 of FIG. 3, the present invention starts switching when the output voltage is higher than the input voltage. As illustrated in FIG. 7, the present invention initiates switching during the second half of the 180-degree cycle when the voltage of a capacitor C1 is higher than the AC input since a plurality of rectifying diodes D1 are reverse biased. Referring back to FIG. 3, Graph 1 illustrates the capacitor characteristics when the capacitor C1 is charging and the plurality of rectifying diodes D1 is conducting current to the capacitor C1. On the other hand, Graph 2 of FIG. 3 illustrates the switching process that takes place during the discharging phase of the capacitor C1 with the plurality of rectifying diodes D1 being reverse biased. When the plurality of rectifying diodes D1 is reverse biased, the capacitor C1 voltage is higher than the input voltage.

Figure 4:
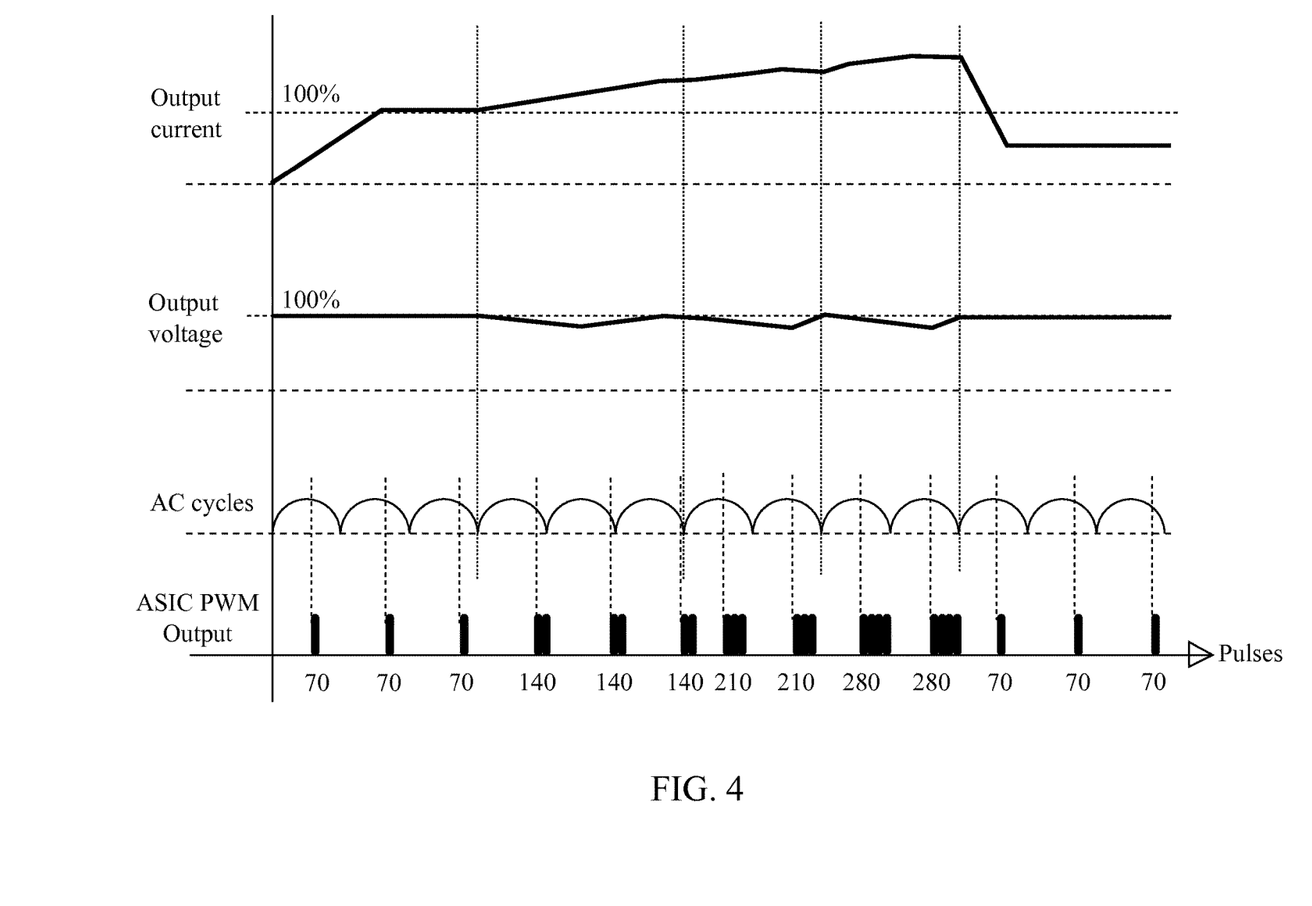
FIG. 4 illustrates the output current and output voltage variations according to the number of pulses generated by the pulse count controlling unit.
Figure 5:
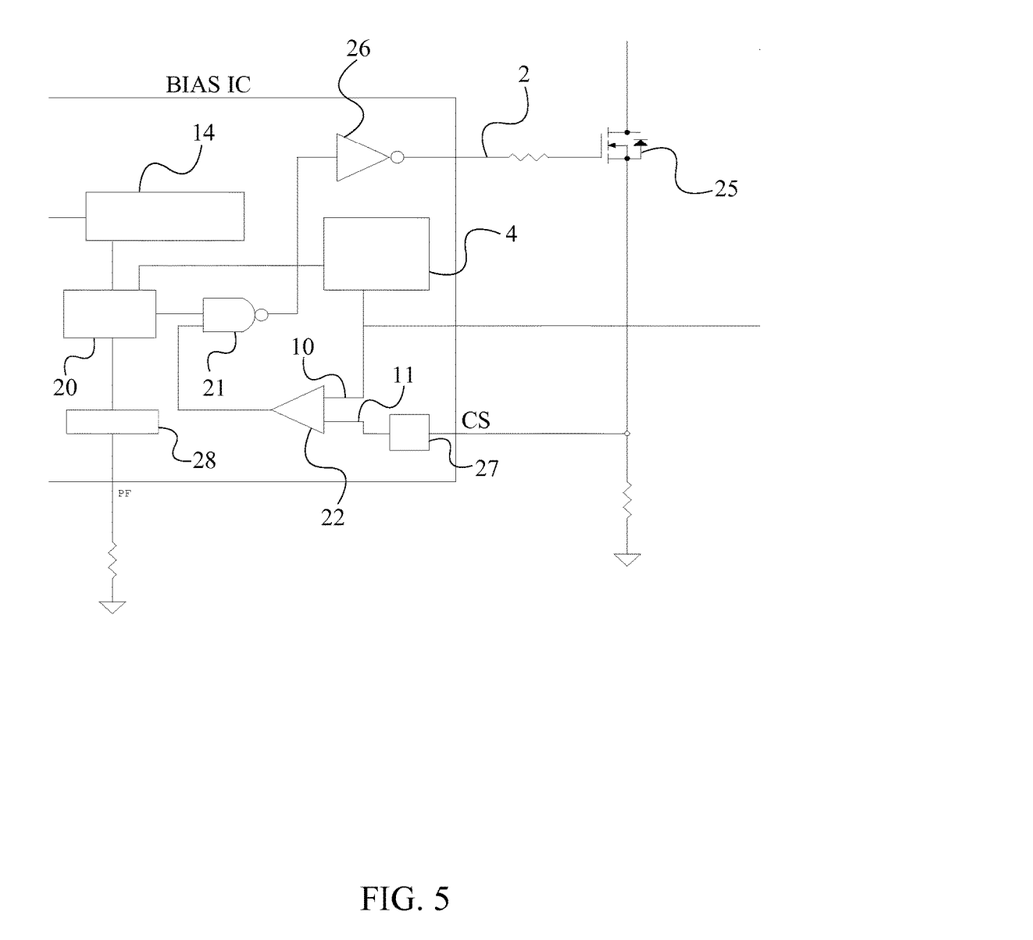
FIG. 5 illustrates the pulse count controlling unit and the related components of the present invention.

Most wireless devices require a limited amount of power. However, these devices require additional power during different stages of wireless communication, especially when transmitting a signal to another wireless device. In order to supply the required power, the power supply needs to be equipped with means to increase power when necessary. In the present invention, the pulse count controlling unit 4 facilitates the required additional power by increasing the number of pulses per cycle. As illustrated in FIG. 4, with the increasing current, the load begins to transmit energy resulting in a drop in output voltage. The drop in output voltage results in a drop of power across the output load. In order to compensate the reduced voltage, the pulse count controlling unit 4 increases the number of pulses per cycle such that the overall power supplied to the output load is increased. As an example, if 70 pulses were initially used to provide 1 watt of power, the number of pulses are increased to 140 pulses in order to provide 2 watts of power. When the output voltage stabilizes at normal operating conditions, the number of pulses per cycle returns back to 70 within a short period of time as shown in FIG. 4. In particular, depending on the system requirements the pulse count controlling unit 4 provides a short boost of power within a short time duration. As seen in FIG. 5, the present invention utilizes a not-and (NAND) gate 21 and a second comparator 22 along with the pulse count controlling unit 4. In doing so, an output of the oscillator 20 is electronically connected into the pulse count controlling unit 4. Moreover, the pulse count controlling unit 4 is electronically connected into an inverting input 10 of the second comparator 22. The current flow to the remaining components of the circuit is controlled by a switching field-effect transistor (FET) 25. A source of the switching FET 25 is electronically connected into a non-inverting input 11 of the second comparator 22 such that the switching FET 25 is in a common source configuration. In particular, a gate, a drain, and the source is electronically arranged in a common source configuration. Further elaborating on the pulse count controlling unit 4, an output of the second comparator 22 is electronically connected into a first input of the NAND gate 21. In order to complete the input to the NAND gate 21, the output of the oscillator 20 is electronically connected into a second input of the NAND gate 21. When the first input and the second input are satisfied, an output from the NAND gate 21 is drawn out and electronically connected to the signal output 2. The present invention further comprises a gate driver 26 which is electronically integrated between the output of the NAND gate 21 and the source of the switching FET 25. The gate driver 26 is utilized to amplify the input received from the NAND gate 21 and produce a high-current drive input to the gate of the switching FET 25. The present invention utilizes a leading edge blanking circuit 27 which is used to avoid false overcurrent tripping. In order to do so, the leading edge blanking circuit 27 is electronically integrated between the source of the switching FET 25 and the positive input of the second comparator 22.

Figure 6:
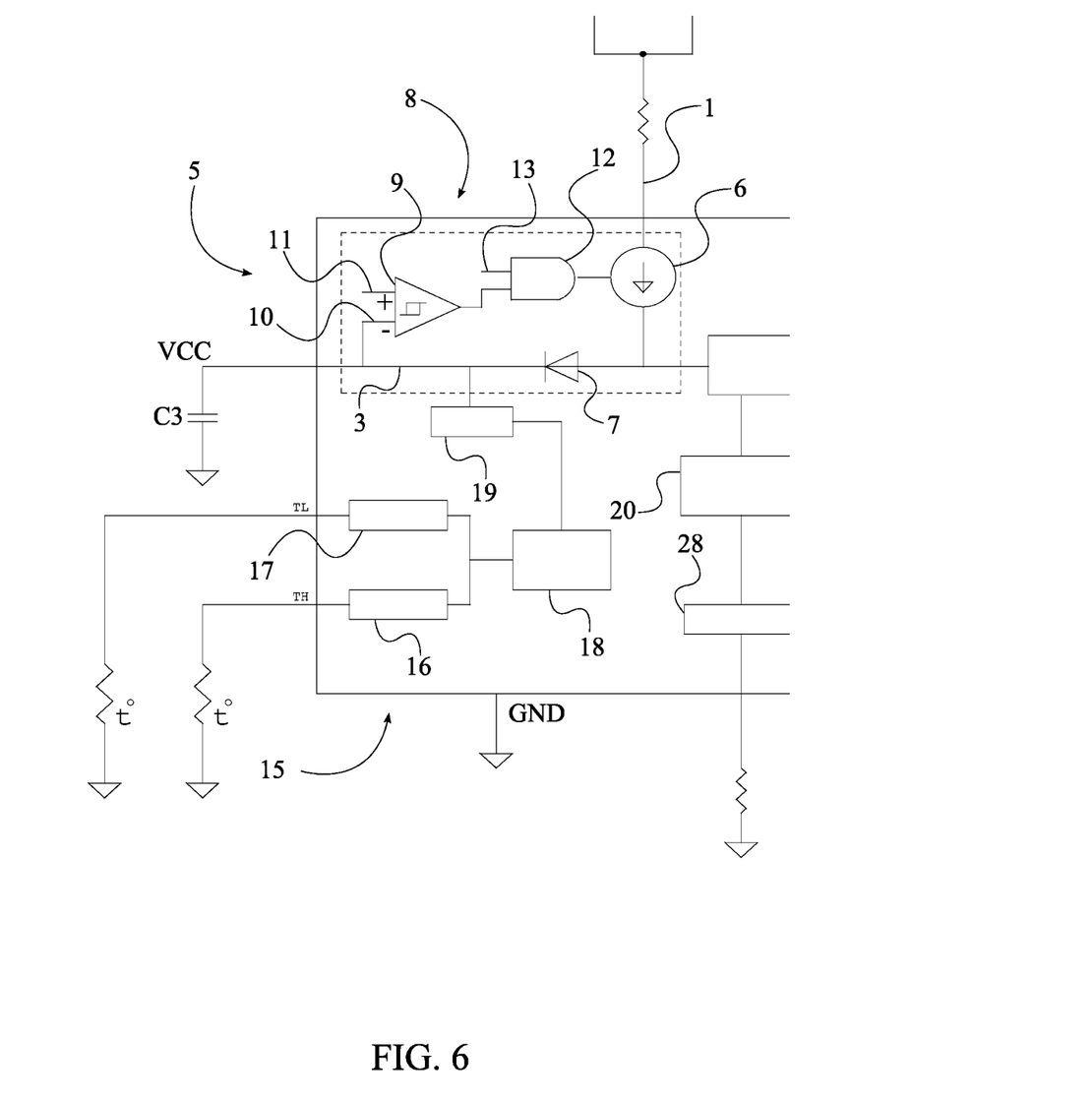
FIG. 6 illustrates the stand-by power reduction unit and the temperature sensing unit utilized in the present invention.

As discussed earlier, the stand-by power reduction unit 5 is utilized to disconnect the power supply to the present invention based upon the system needs. In particular, the stand-by power reduction unit 5 is used for a voltage regulating capacitor C3, which is used to maintain the voltage across the present invention. Moreover, the voltage regulating capacitor C3 stores energy and supplies power during a discontinuous mode of the capacitor such that the extra heat generation is eliminated. Therefore, the overall efficiency of the present invention is increased. As an example, consider the AC input to be 300V, and the required voltage for the voltage regulating capacitor C3 to function to be 20V. The higher voltage of 300V reduces the time constant of the voltage regulating capacitor C3 and charges the voltage regulating capacitor C3 within a comparatively short time period. However, the difference of 280V between the input voltage and the voltage across the voltage regulating capacitor C3 is wasted. In order to prevent the waste of energy, the stand-by power reduction unit 5 charges the voltage regulating capacitor C3 only when necessary and cuts off the power when the voltage regulating capacitor C3 is completely charged. In doing so, the stand-by power reduction unit 5 turns off the switching FET 25 so that the energy waste is eliminated. Resultantly, the current through the load remains constant with no additional voltage applied across the load and thus improves the overall efficiency of the present invention. The stand-by power reduction unit 5 utilized in the present invention comprises a current source 6, a diode 7, and a voltage modification circuit 8. The diode 7 controls the direction of the current provided by the current source 6. In doing so, the current source 6 is electronically connected to an input terminal of the diode 7 through the load line 3. In particular, the diode 7 is forward biased for the current flowing from the current source 6. As seen in FIG. 6, an output terminal of the diode 7 is electronically connected to the voltage regulating capacitor C3, through the load line 3. The voltage modification circuit 8 detects the cycle of the AC input in order to disconnect the current supply to the voltage regulating capacitor C3. In order to do so, an input of the voltage modification circuit 8 is electronically connected to the load line 3 in between the output terminal of the diode 7 and the voltage regulating capacitor C3. An output of the voltage modification circuit 8 is electronically connected to the current source 6 such that the necessary modifications can be applied effectively. In the preferred embodiment of the present invention, the voltage modification circuit 8 comprises a first comparator 9, a first reference voltage source, an AND gate 12, and a second reference voltage source 13. The second reference voltage source 13 defines the voltage level to be higher than the voltage across the current source. In such instances, the capacitor is turned off. If the voltage level is below the voltage across the current source, the capacitor C3 is turned on. In doing so, the input for the voltage modification circuit 8 is configured to be an inverting input 10 of the first comparator 9. Moreover, the first reference voltage source is electronically connected to a non-inverting input 11 of the first comparator 9. When the inputs are electronically connected, an output of the first comparator 9 is electronically connected to a first input of the AND gate 12. To complete the inputs for the AND gate 12, the second reference voltage source 13 is electronically connected to the second input of the AND gate 12. The resultant output of the voltage modification circuit 8 is drawn from an output of the AND gate 12.

The temperature sensing unit 15 is utilized to detect the temperature of the components used in the present invention. In the present invention, when the electrolytic capacitors lose its capacitance at low temperatures, the system ignores the unstable feedback and works in a limited power working mode with a fixed number of pulses and a fixed pulse width. As a result, the power transmitted to the load is limited. As a result, of the limited power working mode, the present invention can return back to a working mode in a timely manner. The loss of capacitance in a first output capacitor C2 and a second output capacitor C4 of the present invention leads to a decline in the system performance since the output is unable to maintain the required voltage. When a very low temperature is initially detected, the temperature sensing unit 15 ensures that the present invention works in a power limiting working mode. In order to do so, the present invention ignores the fly-back loop from the signal output and maintains a constant limited power level through a fixed number of pulses and fixed pulse width. As a result, the present invention generates heat until the temperature of the electrolytic capacitor increases to a value which is in the operational temperature range. In order to maintain the output voltage the temperature sensing unit 15 is electronically connected to the load line 3 in between the output terminal of the diode 7 and the voltage regulating capacitor C3. As seen in FIG. 6, the temperature sensing unit 15 comprises a low temperature sensor 17, a circuit protection command module 18, and a triggering circuit 19. The low temperature sensor 17 is electronically connected into an input of the circuit protection command module 18 such that the signal from the low temperature sensor 17 is transferred to the circuit protection command module 18 promptly. On the other hand, an output of the circuit protection command module 18 is electronically connected into the triggering circuit 19. The triggering circuit 19 then provides a fixed number of pulses and the fixed pulse width regardless of the output voltage. An output of the triggering circuit 19 is electronically connected to the load line 3 such that the additional voltage can be provided to the circuit effectively. Additionally, the temperature sensing unit 15 further comprises a high temperature sensor 16. The high temperature sensor 16 is mainly utilized for protective purposes. In particular, the high temperature sensor 16 detects any abnormal temperature rise which can cause the present invention to overheat. When the temperature rise is detected, the high temperature sensor 16 shuts off the power such that the present invention is protected from overheating. In order to do so, the high temperature sensor 16 is electronically connected into an input of the circuit protection command module 18. Similar to the low temperature sensor 17, the high temperature sensor 16 is electronically connected into an input of the circuit protection command module 18. Since the circuit protection module and the triggering circuit 19 are electronically connected, the triggering circuit 19 can shut off the current flow such that the present invention is protected from high temperatures. When the temperature returns to the normal working temperature, the command module resets the present invention such that the present invention can function under normal working conditions.

Although the invention has been explained in relation to its preferred embodiment, it is to be understood that many other possible modifications and variations can be made without departing from the spirit and scope of the invention as hereinafter claimed.

What is claimed is:

1. A circuit for electromagnetic interference (EMI) reduction through pulse modification comprises:
   a signal input;
   a signal output;
   a load line;
   a pulse count controlling unit;
   a stand-by power reduction unit;
   a pulse series delay unit;
   a temperature sensing unit;
   an oscillator;
   the signal input being electronically connected to the load line;
   the load line being electronically integrated through the stand-by power reduction unit;
   the temperature sensing unit being electronically connected into the load line;
   the pulse series delay unit being electronically connected into the load line;
   the pulse series delay unit being electronically connected to the oscillator;
   the oscillator being electronically connected to the pulse count controlling unit; and
   the pulse count controlling unit being electronically connected to the signal output.

2. The circuit for electromagnetic interference (EMI) reduction through pulse modification as claimed in claim 1 comprises:

the stand-by power reduction unit comprises a current source, a diode, and a voltage modification circuit;

the current source being electronically connected to an input terminal of the diode through the load line;

an output terminal of the diode being electronically connected to a voltage regulating capacitor through the load line;

an input for the voltage modification circuit being electronically connected to the load line in between the output terminal of the diode and the voltage regulating capacitor; and an output for the voltage modification circuit being electronically connected to the current source.

3. The circuit for electromagnetic interference (EMI) reduction through pulse modification as claimed in claim 2 comprises:

the voltage modification circuit comprises a first comparator, a first reference voltage source, an AND gate, and a voltage boosting source;

the input for the voltage modification circuit being an inverting input of the first comparator;

the first reference voltage source being electronically connected to a non-inverting input of the first comparator;

an output of the first comparator being electronically connected to a first input of the AND gate;

the voltage boosting source being electronically connect to the second input of the AND gate; and the output of the voltage modification circuit being an output of the AND gate.

4. The circuit for electromagnetic interference (EMI) reduction through pulse modification as claimed in claim 2, wherein the temperature sensing unit being electronically connected to the load line in between the output terminal of the diode and the voltage regulating capacitor.

5. The circuit for electromagnetic interference (EMI) reduction through pulse modification as claimed in claim 1 comprises:

the temperature sensing unit comprises a high temperature sensor, a low temperature sensor, a circuit protection command module, and a triggering circuit;

the high temperature sensor being electronically connected into an input of the circuit protection command module;

the low temperature sensor being electronically connected into the input of the circuit protection command module;

an output of the circuit protection command module being electronically connected into the triggering circuit; and an output of the triggering circuit being electronically connected to the load line.

6. The circuit for electromagnetic interference (EMI) reduction through pulse modification as claimed in claim 1 comprises:

a not-and (NAND) gate;

a second comparator;

an output of the oscillator being electronically connected into the pulse count controlling unit;

the pulse count controlling unit being electronically connected into an inverting input of the second comparator;

a source of a switching field-effect transistor (FET) being electronically connected into a non-inverting input of the second comparator;

an output of the second comparator being electronically connected into a first input of the NAND gate;

the output of the oscillator being electronically connected into a second input of the NAND gate; and an output of the NAND gate being electronically connected to the signal output.

7. The circuit for electromagnetic interference (EMI) reduction through pulse modification as claimed in claim 6 comprises:

a gate driver; and the gate driver being electronically integrated between the output of the NAND gate and the source of the switching FET.

8. The circuit for electromagnetic interference (EMI) reduction through pulse modification as claimed in claim 6, wherein the gate, the source, and a drain of the switching FET are electronically arranged in a common source configuration.

9. The circuit for electromagnetic interference (EMI) reduction through pulse modification as claimed in claim 6 comprises:

a leading edge blanking circuit; and the leading edge blanking circuit being electronically integrated between the source of the switching FET and the positive input of the second comparator.

10. The circuit for electromagnetic interference (EMI) reduction through pulse modification as claimed in claim 6 comprises:

a frequency setting unit; and the frequency setting unit being electronically connected to the oscillator.

11. A circuit for electromagnetic interference (EMI) reduction through pulse modification comprises:

a signal input;

a signal output;

a load line;

a pulse count controlling unit;

a stand-by power reduction unit;

a pulse series delay unit;

a temperature sensing unit;

an oscillator;

the signal input being electronically connected to the load line;

the load line being electronically integrated through the stand-by power reduction unit;

the temperature sensing unit being electronically connected into the load line;

the pulse series delay unit being electronically connected into the load line;

the pulse series delay unit being electronically connected to the oscillator;

the oscillator being electronically connected to the pulse count controlling unit;

the pulse count controlling unit being electronically connected to the signal output;

the stand-by power reduction unit comprises a current source, a diode, and a voltage modification circuit;

the current source being electronically connected to an input terminal of the diode through the load line;

an output terminal of the diode being electronically connected to a voltage regulating capacitor through the load line;

an input for the voltage modification circuit being electronically connected to the load line in between the output terminal of the diode and the voltage regulating capacitor; and an output for the voltage modification circuit being electronically connected to the current source.

12. The circuit for electromagnetic interference (EMI) reduction through pulse modification as claimed in claim 11 comprises:
the voltage modification circuit comprises a first comparator, a first reference voltage source, an AND gate, and a voltage boosting source;
the input for the voltage modification circuit being an inverting input of the first comparator;
the first reference voltage source being electronically connected to a non-inverting input of the first comparator;
an output of the first comparator being electronically connected to a first input of the AND gate;
the voltage boosting source being electronically connect to the second input of the AND gate; and
the output of the voltage modification circuit being an output of the AND gate.

13. The circuit for electromagnetic interference (EMI) reduction through pulse modification as claimed in claim 11, wherein the temperature sensing unit being electronically connected to the load line in between the output terminal of the diode and the voltage regulating capacitor.

14. The circuit for electromagnetic interference (EMI) reduction through pulse modification as claimed in claim 11 comprises:
the temperature sensing unit comprises a high temperature sensor, a low temperature sensor, a circuit protection command module, and a triggering circuit;
the high temperature sensor being electronically connected into an input of the circuit protection command module;
the low temperature sensor being electronically connected into the input of the circuit protection command module;
an output of the circuit protection command module being electronically connected into the triggering circuit; and
an output of the triggering circuit being electronically connected to the load line.

15. The circuit for electromagnetic interference (EMI) reduction through pulse modification as claimed in claim 11 comprises:
a not-and (NAND) gate;
a second comparator;
an output of the oscillator being electronically connected into the pulse count controlling unit;
the pulse count controlling unit being electronically connected into an inverting input of the second comparator;
a source of a switching field-effect transistor (FET) being electronically connected into a non-inverting input of the second comparator;
an output of the second comparator being electronically connected into a first input of the NAND gate;
the output of the oscillator being electronically connected into a second input of the NAND gate; and
an output of the NAND gate being electronically connected to the signal output.

16. The circuit for electromagnetic interference (EMI) reduction through pulse modification as claimed in claim 15 comprises:
a gate driver; and
the gate driver being electronically integrated between the output of the NAND gate and the source of the switching FET.

17. The circuit for electromagnetic interference (EMI) reduction through pulse modification as claimed in claim 15, wherein the gate, the source, and a drain of the switching FET are electronically arranged in a common source configuration.

18. The circuit for electromagnetic interference (EMI) reduction through pulse modification as claimed in claim 15 comprises:
a leading edge blanking circuit; and
the leading edge blanking circuit being electronically integrated between the source of the switching FET and the positive input of the second comparator.

19. The circuit for electromagnetic interference (EMI) reduction through pulse modification as claimed in claim 15 comprises:
a frequency setting unit; and
the frequency setting unit being electronically connected to the oscillator.

* * * * *